United States Patent [19]

Walker

[11] 4,422,331

[45] Dec. 27, 1983

[54] PHASE MODULATOR LASER ACCELEROMETER

[76] Inventor: Clifford G. Walker, 91 Weatherly Rd., Huntsville, Ala. 35803

[21] Appl. No.: 364,745

[22] Filed: Apr. 2, 1982

[51] Int. Cl.$^3$ ............................................. G01P 15/13
[52] U.S. Cl. ................................ 73/517 B; 73/862.38; 73/517 R
[58] Field of Search ............. 73/517 R, 517 B, 516 R, 73/516 LM, 862.38

[56] References Cited

U.S. PATENT DOCUMENTS

| | | | |
|---|---|---|---|
| 3,506,362 | 4/1970 | Doyle et al. | 356/111 |
| 3,517,560 | 6/1970 | Jacobs et al. | 73/516 |
| 3,800,594 | 4/1974 | Hutchings et al. | 73/516 R |
| 4,039,260 | 8/1977 | Redman | 356/106 |
| 4,155,251 | 5/1979 | Lautzenhiser | 73/862.38 |
| 4,233,847 | 11/1980 | Walker | 73/517 R |

OTHER PUBLICATIONS

Goss et al., "Fiber-Optic Rotation Sensor Technology" from Applied Optics, vol. 19, No. 6, Mar. 15, 1980, pp. 852-858.

Merz et al., "GaAs Integrated Optical Circuits by Wet Chemical Etching" from IEEE Journal of Quantum Electronics, vol. QE-15, No. 2 Feb. 1979, pp. 72-82.

Garmire, "Optical Waveguide for Laser Gyro Applications" from SPIE vol. 157 Laser Inertial Rotation Sensors, 1978, pp. 95-99.

Leonberger et al., "Low-loss GaAs p$^+$n$^-$n$^+$ three-dimensional optical waveguides" from Applied Physics Letters, vol. 28, No. 10, May 15, 1976, pp. 616-619.

Anderson, "Integrated Optical Spectrum Analyzer: an imminent 'chip'" IEEE Spectrum, Dec. 1974, pp. 22-29.

Primary Examiner—James J. Gill
Attorney, Agent, or Firm—Robert P. Gibson; Anthony T. Lane; Freddie M. Bush

[57] ABSTRACT

A laser accelerometer produces an output, phase modulated beam which is polarized in a direction perpendicular to the direction from which acceleration forces are applied. In the accelerometer a laser beam is directed through a resonant cavity toward a detector. A proof mass disposed adjacent the cavity, stresses the cavity in response to acceleration force. Acceleration detunes the cavity. Detected changes in the cavity output results in a feedback voltage change being coupled to the cavity and to an output detector. This change in voltage to restore cavity resonance is proportional to the input acceleration.

10 Claims, 6 Drawing Figures

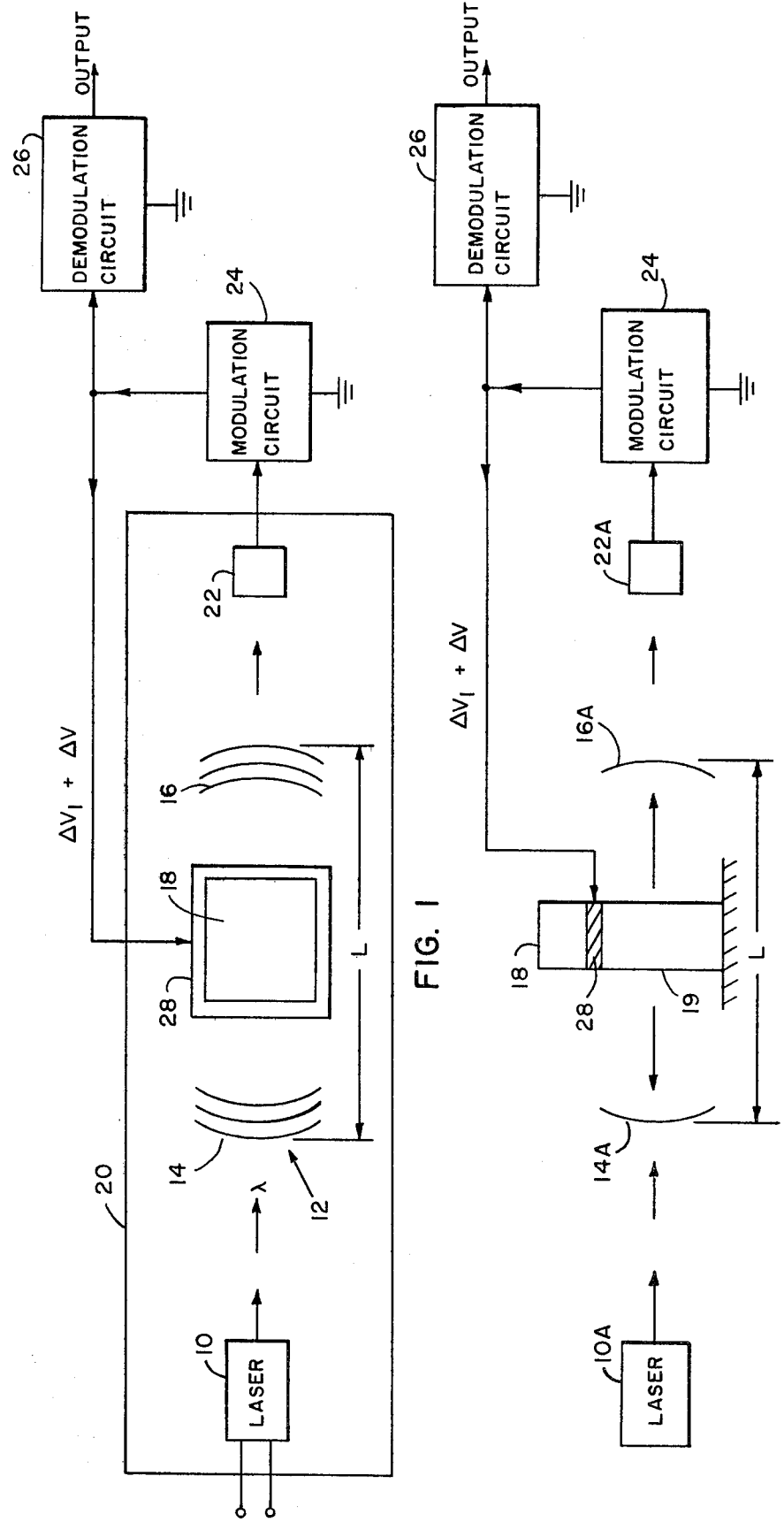

PHASE MODULATOR LASER ACCELEROMETER

DEDICATORY CLAUSE

The invention described herein may be manufactured, used, and licensed by or for the Government for governmental purposes without the payment to me of any royalties thereon.

SUMMARY OF THE INVENTION

An accelerometer for phase modulation produces an output modulated beam polarized perpendicular to the direction from which acceleration forces to be measured occur. In the accelerometer a laser beam enters a resonant cavity and is directed toward a detector. A proof mass is disposed adjacent the resonant cavity and is responsive to acceleration forces to stress the cavity causing the resonant cavity to be detuned. The detector and a modulation feedback circuit responds to the change and restores resonance in the cavity by changing a feedback voltage, effectively changing the optical path length in the cavity. This change in voltage to restore resonance is proportional to the input acceleration.

BRIEF DESCRIPTION OF THE DRAWINGS

FIG. 1 is a digrammatic view of a phase modulation laser accelerometer using integrated optical and electrical components.

FIG. 2 is an alternative embodiment of the accelerometer using discrete components.

DESCRIPTION OF THE PREFERRED EMBODIMENT

Figure 3:
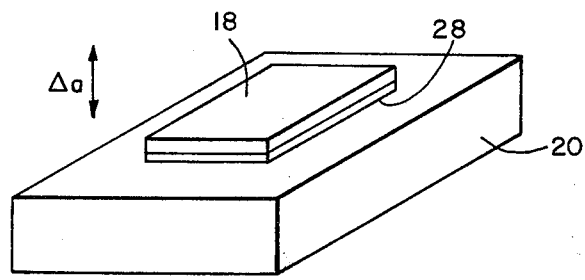
FIG. 3 is a diagrammatic view of the interface between the proof-mass and substrate of FIG. 1.
Figure 4:
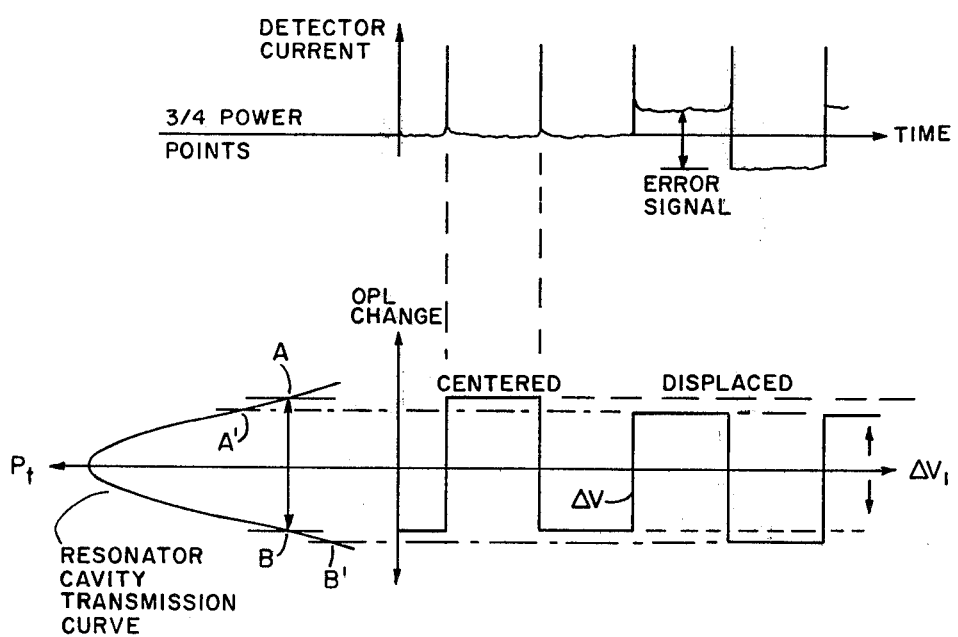
FIG. 4 is a graph showing the relationship between modulator dither voltage $\Delta V$, the signal voltage $\Delta V_1$, and maximum slope points of the resonator transmission curve.

Referring now to the drawings wherein like numbers represent like parts, a phase modulation laser accelerometer is shown in FIG. 1. Optical portions of the accelerometer comprises a laser diode 10 having an output wavelength $\lambda$, and a Fabry-Perot interferometer 12 having grating mirrors 14 and 16. A photoelastic electro-optical material 20 such as gallium arsenide (GaAs) is the substrate material within which the optical components and a detector 22 are formed. Electronic portions of the accelerometer include the photodetector 22, a modulation circuit 24, a demodulation circuit 26, and an electro-optic phase modulator 238. Modulator 28 changes the refractive index in proportion to the applied voltage. As shown in FIG. 3, phase modulator 28 is disposed between a proof mass 18 and photoelastic electrooptic substrate 20. Phase modulator 28 is driven by modulation circuit 24 which provides a variable direct current (d.c.) voltage ($\Delta V_1$) and a dither voltage ($\Delta V$), a constant rate varying d.c. voltage. The voltages $\Delta V_1$, and $\Delta V$ change the optical path length of the resonator 12 providing resonance via the feedback circuit. The rate at which voltage $\Delta V$ varies provides detector shot-noise-limited operation. The magnitude of $\Delta V$ is adjusted to coincide with the maximum slope points A and B of the resonant cavity transmission curve, which is the three-quarter power points on the curve as shown in FIG. 4. The output of demodulator 26 is the varying d.c. voltage $\Delta V_1$ which changes proportional to the change in input acceleration $\Delta a$.

In operation laser diode 10 is energized to produce a horizontally polarized laser beam which is guided to reflector 14, a partially transmitting reflector, and enters the resonant cavity of interferometer 12. The interferometer cavity is defined by the length (L) between the two partially transmitting reflectors 14 and 16 which is a multiple (N) of halfwave lengths, thus $L=N\lambda/2$. The beam bounces back and forth in the resonant cavity, within the photoelastic substrate 20, and produces an output beam that is detected by detector 22.

With zero input acceleration the phase modulator 28 voltage $\Delta V_1$ is adjusted so that the optical path length (OPL) between the reflectors 14 and 16 is a multiple of $\lambda/2$ which will produce maximum energy transfer through the resonant cavity to be detected by detector 22. The dither or modulation voltage $\Delta V$ is added to $\Delta V_1$, with a preselected magnitude to coincide with or include the most sensitive part of the curve at the maximum slope points of the cavity transmission curve located at the three-quarter power points of the curve as shown in FIG. 4. This scanning Fabry-Perot interferometer type operation ensures maximum accelerometer sensitivity. $\Delta V$ varies at a rate which is selected to provide detector shot-noise-limited operation.

When the proof-mass 18 is accelerated perpendicular to the plane of the photoelastic substrate 20, it will stress the substrate thereunder, causing a change in refractive index and thereby changing the OPL of the resonant cavity, detuning the cavity. The stress direction is perpendicular to the direction of the polarized laser beam emanating from laser source 10 and assures maximum change in output intensity for a change in acceleration $\Delta a$. The detector 22 detects this change and via the modulation feedback circuit 24 changes the output voltage $\Delta V_1$ to the phase modulator to restore resonance in the interferometer. The demodulator 26 provides the variable voltage $\Delta V_1$ as an output. This voltage is proportional to any change in acceleration $\Delta a$.

In the alternative embodiment of FIG. 2 discrete optical components operate in the same manner as the integrated optics structure of FIG. 1. The different, discrete optical components being identified with the letter A. Thus laser 10A directs an output beam through the resonant cavity defined by partially reflective members 14A and 16A and into detector 22A. Photoelastic material 19 responds to acceleration forces to change cavity resonance.

FIG. 4 shows the relationship between the voltages $\Delta V_1$ and $\Delta V$ applied to the phase modulator and the detector output current where the dither voltage $\Delta V$ causes a sweep of the resonator transmission curve at the most sensitive part of the curve, the maximum slope points (A and B) of the curve located at the three-quarter power level. When the dither voltage ($\Delta V$) to the phase modulator changes by the addition of $\Delta V_1$, it changes the OPL of the resonator which detunes the resonator causing less than maximum power (A' and B') to be passed through the resonator and detected as an error signal input by the detector. The upper and lower voltage values of the dither is set at the maximum slope points of the resonator transmission curve because these points are the most sensitive points on the curve.

When acceleration forces stress the proof mass and cause a change in the resonator OPL it detunes the resonator causing the error signal as shown in FIG. 4. The output of the modulator circuit provides voltage $\Delta V_1$ to the phase modulator which restores resonance in the resonator and drives the error signal to zero. The change in voltage $\Delta V_1$ is proportional to the input acceleration.

The output voltage change $\Delta V_1$ as related to a change in acceleration $\Delta a$ can be derived as follows:

A constant voltage $V_1$ applied to the phase modulator causes the electro-optics, photoelastic material to have an OPL with a refractive index of n. The magnitude of constant voltage $V_1$ is at a level which coincides with the three-quarter power points on the cavity transmission curve; as is shown in FIG. 4. Thus by varying the voltage to either side of $V_1$ selectively, $\Delta V_1$ is obtained and:

$$\Delta V_1 = K(\Delta n)_1 \quad (1)$$

When acceleration forces $\Delta a$ stress the proof mass the refractive index changes, therefore, $$(\Delta n)_2 = \frac{B\, m\, \Delta a}{A}. \quad (2)$$

The feedback circuit maintains the relationship:

$$(\Delta n)_1 = (\Delta n)_2. \quad (3)$$

Substituting in equations 1 and 2 yields:

$$\Delta V_1/K = \frac{B\, m\, \Delta a}{A}, \text{ or } \Delta V_1/\Delta a = B\, m\, K/A \text{ for the output;} \quad (4)$$

where
 K = electro-optic coefficient ($\Delta V/\Delta n$),
 B = photoelastic constant of photoelastic material, which is $160 \times 10^{-13}$ cm$^2$/dyne for GaAs,
 m = proof-mass attached to the photoelastic material, and
 A = area of proof-mass attached to the photoelastic material.

For a monolithic design a typical example of sensitivity is as follows:
 A = 0.1 cm$^2$ K = $10^6$, B = 160 $\times 10^{-13}$ cm$^2$/dyne (for GaAs), m = 10 grams, and
 $\Delta V_1/\Delta a$ = 1600 micro-volts/cm/second$^2$.

Figure 5:
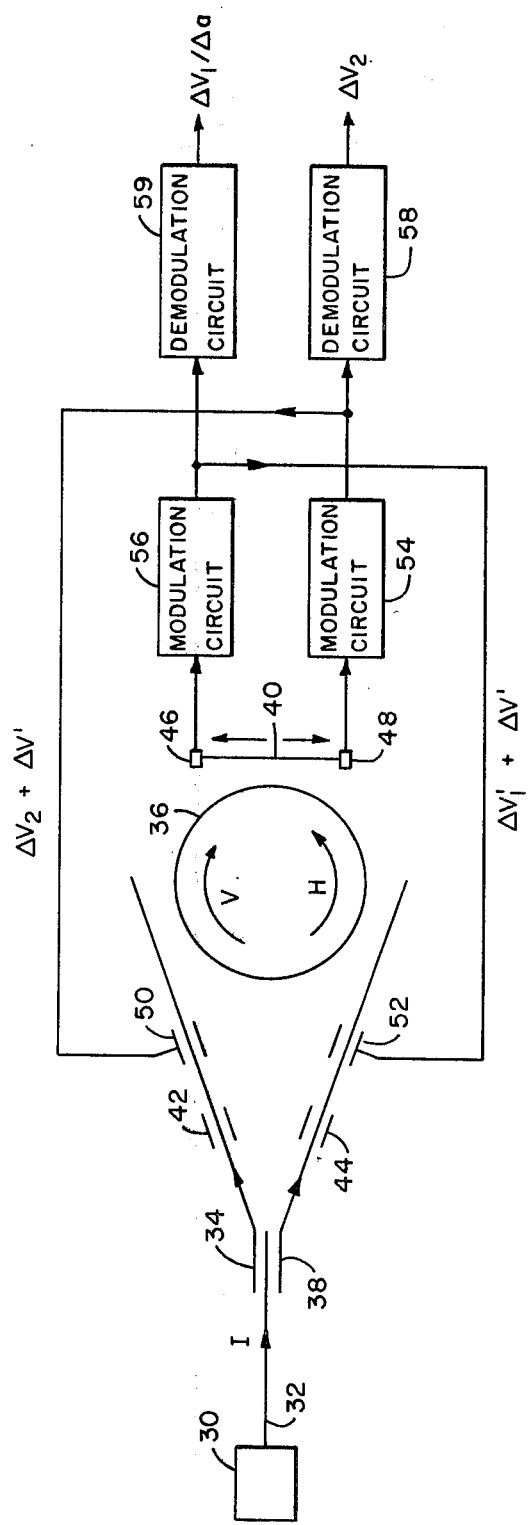
FIG. 5 is an alternative embodiment, diagrammatic, of a phase modulation laser accelerometer using integrated optical and electrical components.
Figure 6:
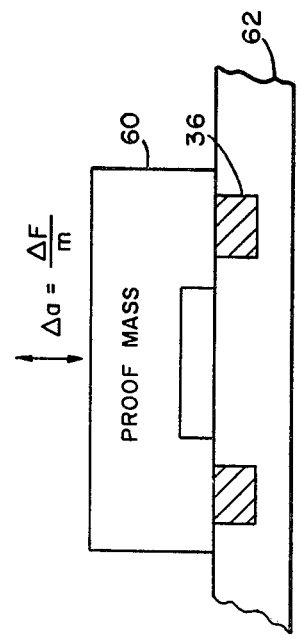
FIG. 6 is a diagrammatic cutaway view of the interface between the proof mass and ring resonator of FIG. 5.

A second integrated optics phase modulation laser accelerometer is shown in FIG. 5. Optical portions of the accelerometer comprises a laser diode 30 with output beam intensity I, input waveguide 32, intermediate waveguides 34, 36, and 38, and output waveguide 40, vertical polarizer element 42, and horizontal polarizer element 44. Electronic portions of the accelerometer include photodetectors 46 and 48, electro-optic phase modulators 50 and 52, modulation circuits 54 and 56, and demodulation circuits 58 and 59. As shown in FIG. 6, a proof mass 60 is attached to ring resonator waveguide 36. All of the optical waveguides are formed in substrate 62 using a photoelastic electro-optic material such as gallium arsenide (GaAs) as the substrate. The basic operation is similar to the above embodiments. However, in this embodiment waveguide-to-waveguide directional coupling (W-W-DC) is used to split and add the two beams which are polarized, one in the horizontal direction, H, and the other in the vertical direction, V. The optical path length OPL of the vertical V polarized beam is not affected by the stress caused by acceleration forces so this beam is a reference beam. The other beam polarized in the horizontal direction H is the signal beam, therefore, the accelerometer operates in a differential manner.

In operation laser diode 30 is energized to produce an unpolarized beam with intensity I which travels in waveguide 32 until the beam is split into two beams by W-W-DC. The two beams with intensity I/2 travel in waveguides 34 and 38 respectively. The beam in waveguide 34 passes through vertical polarizer 42 and phase modulator 50 prior to entering ring resonator waveguide 36. Similarly, the beam in waveguide 38 passes through horizontal polarizer 44 and phase modulator 52 prior to entering waveguide 36. The two counter-circulating polarized beams (V and H) in the ring resonator are allowed to enter the output waveguide 40 and are detected respectively by detectors 48 and 46. The output of detector 46 is coupled to modulator 56 and the output of modulator 56 is coupled to the demodulator 59 and to electro-optic phase element 52 which establishes a feedback circuit ($\Delta V_1' + \Delta V'$) as discussed in detail in the other embodiments with respect to $\Delta V_1$ and $\Delta V$.

The output of detector 48 is coupled to modulator 54 and the output of modulator 54 is coupled to electro-optic element 50 establishing the feedback circuit ($\Delta V_2 + \Delta V'$). Since the beam detected by detector 46 was polarized in the horizontal direction or perpendicular to the direction of stress applied to waveguide 36 it is the signal beam and the output of demodulator 59 is voltage $\Delta V_1$ which varies in proportion to the input acceleration. The beam detected by detector 48 is polarized in the vertical direction, therefore, stress caused by acceleration will not change this OPL of waveguide 36. The output of demodulator 58 is a voltage $\Delta V_2$ and is the reference voltage to be compared to the signal voltage $\Delta V_1'$ so that the output voltage of the accelerometer is proportional to acceleration and is a differential value $\Delta V_2 - \Delta V_1'$.

FIG. 6 shows the proof mass 60 attached to the photoelastic waveguide 36 and since the shape of resonator waveguide 36 is in the form of a ring, the proof mass attached to the ring resonator is also in the shape of a ring. This results in the measurement of acceleration being highly directional. Any acceleration forces tending to torque the proof mass 60 will cause both tension and compression in waveguide 36 producing a net stress of zero. Only stress caused by acceleration forces perpendicular to the plane of the waveguide are effectively measured.

Obviously many modifications and variations of the present invention are possible in the light of the above teachings. It is therefore to be understood that within the scope of the appended claims the invention may be practiced otherwise then as specifically described.

I claim:
1. A phase modulation laser accelerometer comprising: a laser for generating a beam of coherent light, photodetection means, a resonant cavity, made of a material having refractive index that changes in response to pressure, disposed between said laser and said photodetection means for providing an optical path therebetween, a proof mass disposed adjacent to said resonant cavity for subjecting said cavity to pressure in response to acceleration substantially normal to the direction of said laser beam, phase modulation means disposed for shifting the phase of laser light passing through said cavity, and feedback means responsive to said photodetection means for providing a variable voltage feedback to said phase modulation means in response to acceleration forces, said variable voltage feedback being indicative of said acceleration forces.

2. A phase modulation laser accelerometer as set forth in claim 1 wherein said feedback means comprises at least a modulation circuit responsive to said photodetection means output for providing a variable voltage to said phase modulation means.

3. A phase modulation laser accelerometer as set forth in claim 2 wherein said photodetection means is a photodetector, said phase modulation means is disposed between said proof mass and said resonant cavity for transmitting acceleration forces from said proof mass to said cavity and for supplying feedback signals to said cavity.

4. A phase modulation laser accelerometer as set forth in claim 3 and further comprising a demodulation circuit coupled to said modulation circuit for detecting said feedback voltage and providing an output responsive thereto.

5. A phase modulation laser accelerometer as set forth in claim 4 wherein said resonant cavity is a Fabry-Perot interferometer having reflective surfaces at each end of said cavity and spaced apart a multiple of half wavelengths of the laser light.

6. A phase modulation laser accelerometer as set forth in claim 5 wherein said laser and said Fabry-Perot interferometer are formed in a photoelastic, electro-optic substrate and said phase modulation means is disposed between said proof mass and the cavity portion of said substrate.

7. A phase modulation laser accelerometer as set forth in claim 5 and further comprising a photoelastic, electro-optic material disposed within the cavity of said interferometer for passage of laser light therethrough, and wherein said phase modulation means is disposed between said proof mass and said photoelastic material.

8. A phase modulation laser accelerometer as set forth in claim 1 wherein said resonant cavity is a ring resonator waveguide, said proof mass is disposed as a circular ring on the surface of said waveguide and further comprising first, second, and third, optical waveguides for coupling laser light into said ring resonator and a fourth optical waveguide for coupling light out of said ring resonator to said photodetection means.

9. A phase modulation laser accelerometer as set forth in claim 8 wherein said first waveguide is disposed for coupling light from said laser into said second and third waveguides, said second and third waveguides being disposed for coupling laser light in opposite directions into said ring resonator; and further comprising a vertical polarizer sadjacent said second waveguide and a horizontal polarizer adjacent said third waveguide for polarizing light coupled from said second and third wveguide in orthogonal directions, and wherein said phase modulation means is first and second phase modulators coupled respectively to said first and second waveguides.

10. A phase modulation laser accelerometer as set forth in claim 9 wherein said laser and waveguides are an integrated optics circuit formed in a photoelastic, electro-optic substrate.

* * * * *